(12) United States Patent
Kim et al.

(10) Patent No.: US 7,977,806 B2
(45) Date of Patent: Jul. 12, 2011

(54) PORTABLE ELECTRONIC DEVICE INCLUDING ELECTRIC GENERATOR

(75) Inventors: Byung-sik Kim, Suwon-si (KR); Hong-sam Kim, Seongnam-si (KR); Hae-soo Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 516 days.

(21) Appl. No.: 12/048,303

(22) Filed: Mar. 14, 2008

(65) Prior Publication Data

US 2008/0284381 A1 Nov. 20, 2008

(30) Foreign Application Priority Data

May 18, 2007 (KR) .................... 10-2007-0048734

(51) Int. Cl.
*H02K 7/18* (2006.01)
(52) U.S. Cl. ........................................... 290/1 C
(58) Field of Classification Search ............ 290/1 C
See application file for complete search history.

(56) References Cited

U.S. PATENT DOCUMENTS

| | | | | |
|---|---|---|---|---|
| 3,099,402 A | * | 7/1963 | Speck | 362/192 |
| 5,917,310 A | * | 6/1999 | Baylis | 322/1 |
| 6,133,642 A | * | 10/2000 | Hutchinson | 290/1 A |
| 6,316,906 B1 | * | 11/2001 | Lozada | 320/101 |
| 6,737,829 B2 | * | 5/2004 | Sastry | 320/101 |
| 6,914,340 B2 | * | 7/2005 | Becker et al. | 290/1 R |
| 6,982,497 B2 | | 1/2006 | Rome | |
| 2006/0250043 A1 | * | 11/2006 | Chung | 310/216 |

FOREIGN PATENT DOCUMENTS

| | | | |
|---|---|---|---|
| CA | 2534757 A1 | * | 7/2007 |
| DE | 20008135 U1 | * | 9/2000 |
| GB | 2456393 A | * | 7/2009 |
| JP | 10052000 A | * | 2/1998 |
| KR | 2002050688 A | * | 6/2002 |
| WO | WO 9842060 A2 | * | 9/1998 |

OTHER PUBLICATIONS

Arik Hesseldahl, "Ten O'Clock Tech: A Flashlight That Goes on Forever", Forbes.com, http://www.forbes.com/2002/05/17/0517tentech_print.html, printed Sep. 5, 2007.
Etón, "FR200 FR200G AM/FM/Shortwave Radio Product Manual" www.etoncorp.com.

* cited by examiner

*Primary Examiner* — Joseph Waks
(74) *Attorney, Agent, or Firm* — Staas & Halsey LLP

(57) ABSTRACT

A portable electronic device includes a case; a revolution body rotatable with respect to the case; an electric generator converting rotational kinetic energy of the revolution body into electrical energy; a gear assembly transferring rotational force of the revolution body to the electric generator, and including at least one gear; and a secondary cell storing the electrical energy generated by the electric generator.

14 Claims, 6 Drawing Sheets

PORTABLE ELECTRONIC DEVICE INCLUDING ELECTRIC GENERATOR

CROSS-REFERENCE TO RELATED PATENT APPLICATION

This application claims the benefit of Korean Patent Application No. 2007-48734, filed on May 18, 2007 in the Korean Intellectual Property Office, the disclosure of which is incorporated herein in its entirety by reference.

BACKGROUND OF THE INVENTION

1. Field of the Invention

Aspects of the present invention relate to a portable electronic device, and more particularly, to a portable electronic device including an electric generator so that the portable electric device can be operated without a separate power source.

2. Description of the Related Art

Portable electronic devices (e.g., mobile phones, MP3 players and portable media players) include an increasing amount of functions (e.g., moving images and games) due to continuous technical development. Accordingly, power consumption of such devices has increased. In portable electronic devices that have been introduced, a power source is provided using a primary cell. Alternately, a charging method is used. In the charging method, electrical energy is supplied to a secondary cell included in the electronic device from an external socket for providing electricity through a cable. However, when a primary cell is used, operational costs of the primary cell can increase in proportion to the use of the portable electronic device. Thus, multiple primary cells are required in order to use a portable electronic device over a prolonged period of time. In addition, environmental pollution can be caused due to used primary cells. Moreover, with regard to the charging method through a cable, it is inconvenient to carry a cable for charging outside, and to look for a socket for providing electricity outside.

SUMMARY OF THE INVENTION

Aspects of the present invention provide a portable electronic device including an electric generator converting rotational kinetic energy of the portable electronic device into electrical energy.

According to an aspect of the present invention, there is provided a portable electronic device including: a case; a revolution body rotatable with respect to the case; an electric generator converting rotational kinetic energy of the revolution body into electrical energy; a gear assembly transferring rotational force of the revolution body to the electric generator, and comprising at least one gear; and a secondary cell storing the electrical energy generated by the electric generator.

According to an aspect of the present invention, the portable electronic device may further include a circuit unit performing a function of an electric device, and disposed in the case.

According to an aspect of the present invention, the portable electronic device may further include an isolation member isolating the gear assembly from the circuit unit, and supporting the at least one gear included in the gear assembly.

According to an aspect of the present invention, the portable electronic device may further include a display panel mounted on the case.

According to an aspect of the present invention, a center of gravity of the revolution body may be eccentric from an axis of rotation of the revolution body.

According to an aspect of the present invention, the portable electronic device may further include a spindle that is disposed on the axis of rotation of the revolution body, and that is not interlocked with the revolution body.

According to an aspect of the present invention, the case and the revolution body may define a housing of the portable electronic device.

According to an aspect of the present invention, the portable electronic device may further include an axis gear that is co-centrically rotated together with the revolution body, and that is engaged with at least one of the gears of the gear assembly to drive the gear assembly.

According to an aspect of the present invention, the gears of the gear assembly may be inscribed on the axis gear.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features, aspects, and advantages of the present invention will become more apparent and more readily appreciated by describing in detail exemplary embodiments thereof with reference to the accompanying drawings in which.

DETAILED DESCRIPTION OF THE EMBODIMENTS

Figure 1:
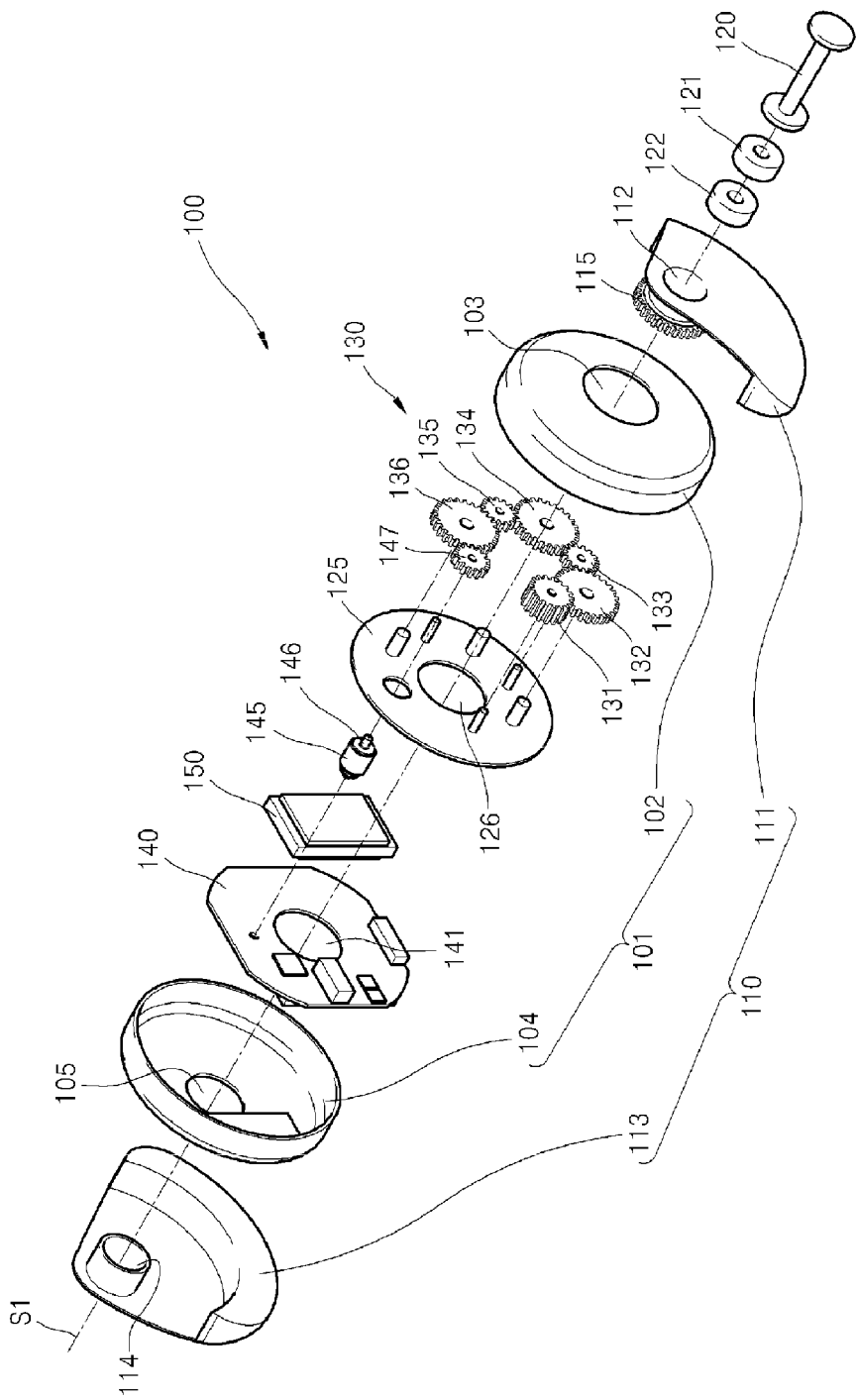
FIG. 1 is an exploded perspective view of a portable electronic device according to an embodiment of the present invention.

Hereinafter, embodiments of the present invention will be described in detail by explaining exemplary embodiments of the invention with reference to the accompanying drawings. Like reference numerals in the drawings denote like elements. The embodiments are described below in order to explain the present invention by referring to the figures.

Figure 2:
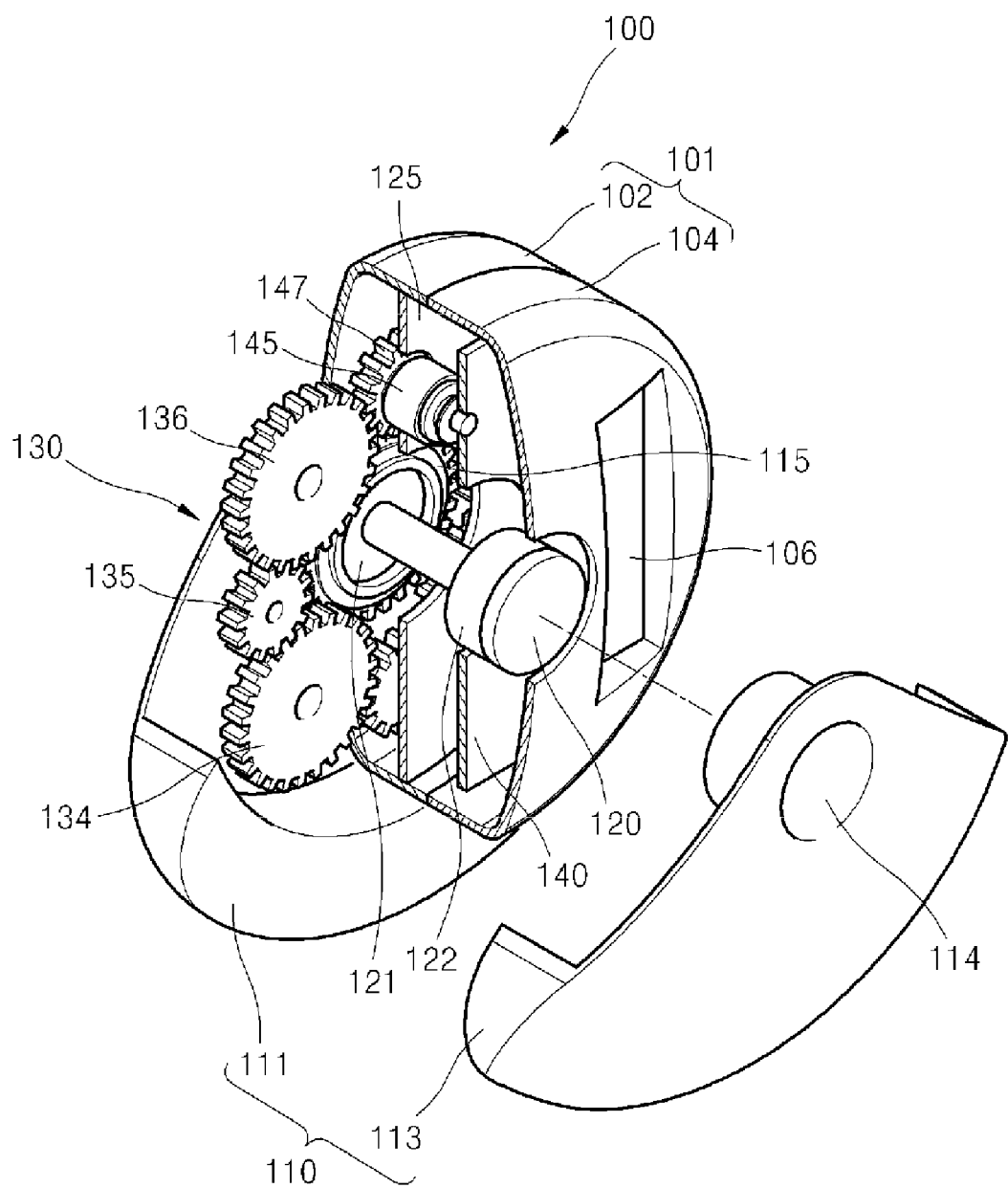
FIG. 2 is a partial perspective view of the portable electronic device of FIG. 1, according to an embodiment of the present invention.
Figure 3:
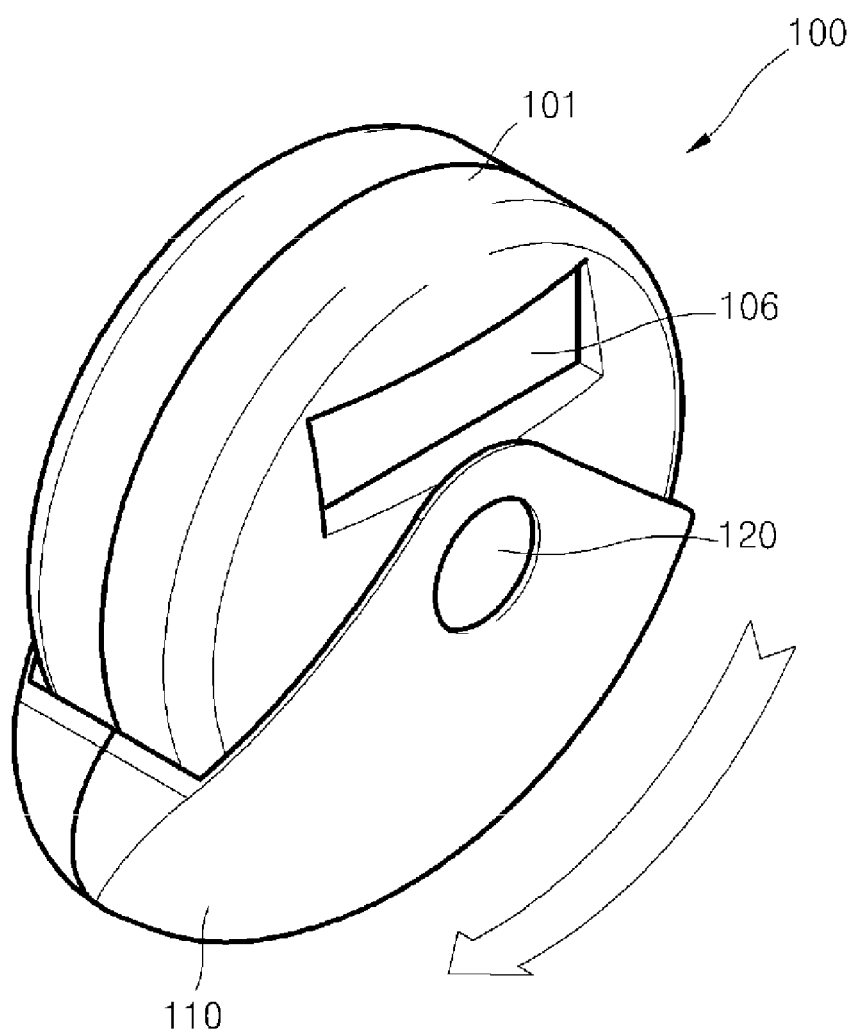
FIG. 3 is a perspective view for illustrating an example of an operation of the portable electronic device of FIG. 1, according to an embodiment of the present invention.

FIG. 1 is an exploded perspective view of a portable electronic device 100 according to an embodiment of the present invention. FIG. 2 is a partial perspective view of the portable electronic device 100 of FIG. 1, according to an embodiment of the present invention. FIG. 3 is a perspective view for illustrating an example of an operation of the portable electronic device 100 of FIG. 1, according to an embodiment of the present invention. While not required, the portable electronic device 100 can be a mobile phone, an audio and/or video player, a portable media player, a camera, a radio, a GPS system, a clock or other like portable device. Moreover, aspects of the invention can be used in toys, sporting equipment with electronic components, and electronic novelty items requiring rechargeable power. As shown, the electronic device is a handheld device capable of being handled in the palm of a hand. However, it is understood that other aspects of the invention can be of other sizes and shapes.

Referring to FIGS. 1 and 2, the portable electronic device 100 includes a case 101, a revolution body 110 mounted on the case 101 so as to be rotatable with respect to the case 101, an electric generator 145 converting rotational kinetic energy of the revolution body 110 into electrical energy, a gear assembly 130 transferring rotational force of the revolution body 110 to the electric generator 145, and a secondary cell 150 storing the electrical energy generated by the electric generator 145. While not required in all aspects, the portable electronic device 100 can include interfaces with respect to which data is transmitted to and from the device 100 and/or recharging power can be introduced into or from the device 100.

The case 101 includes a base member 102 and a cover member 104 that are coupled to each other to define an inner space. The revolution body 110 includes a first revolution body member 111 and a second revolution body member 113 that are coupled to each other. Through holes 103 and 105 are respectively formed in the central parts of the base member 102 and the cover member 104 so that the revolution body 110 may be rotatably coupled to the case 101. The gear assembly 130, the electric generator 145, and the secondary cell 150 are disposed in the case 101. The case 101 also includes a circuit unit 140 and an isolation member 125 isolating the gear assembly 130 from the circuit unit 140.

The revolution body 110 includes an axis gear 115 rotating around an axis of rotation S1 of the revolution body 110. The axis gear 115 is integrally formed with the first revolution body member 111, or alternately, is fixed to the first revolution body member 111 to co-centrically rotate together with the revolution body 110. The axis gear 115 is inserted into the case 101 through the through hole 103 formed in the base member 102. A center of gravity of the revolution body 110 is eccentric from the axis of rotation S1 such that the revolution body 110 creates a moment arm with respect to the axis S1, thus causing the revolution body 110 to rotate whenever the device 100 is moved so as to aid in rotating the revolution body 110 relative to the case 101. However, it is understood that such eccentricity is not required in all aspects, and that other mechanisms can be used in addition to or instead of the eccentricity to aid in rotation, such as grips, handles or protrusions that help force the revolution body 110 and the case 101 to rotate relative to each other.

The portable electronic device 100 further includes a spindle 120 disposed on the axis of rotation S1. The spindle 120 is inserted into through holes 112 and 114 of the first and second revolution body members 111 and 113, and is further inserted through a through hole 126 of the isolation member 125 and a through hole 141 of the circuit unit 140. Both ends of the spindle 120 are supported by the through hole 112 of the first revolution body member 111 and the through hole 114 of the second revolution body member 113 using bearing members 121 and 122 as intermediaries. Due to such a structure, the spindle 120 can not rotate despite revolution of the revolution body 110. The spindle 120 is coupled to the isolation member 125 or the circuit unit 140, which is fixed to the case 101, to be fixed to the case 101. As shown, the spindle 120 has a length such that the spindle 120 can be held between a thumb and a finger, but can have other lengths, such as when the spindle 120 extends outward from the revolution body 110 allowing a user to grip the spindle 120 in the palm of the hand and rotate the revolution body 110 by waving the spindle 120.

While shown with the revolution body 110 outside of the case 101, it is understood that the same or another case could be on the exterior of the revolution body 110 so as to form an outer cover of the device 100 while fixing the spindle 120 to rotate relative to the revolution body 110 rotating inside of the case. Moreover, it is understood that the spindle 120 could be made rotatable in other aspects, such as where the case 101 rotates relative to the revolution body 110.

The gear assembly 130 includes a first gear 131 engaged with the axis gear 115 and driven by the axis gear 115, and second through sixth gears 132, 133, 134, 135 and 136 that are sequentially engaged so as to be sequentially rotated according to revolution of the first gear 131. The first through sixth gears 131 through 136 are supported by the isolation member 125. The sixth gear 136 is engaged with a shaft gear 147 that is coaxially rotated with a shaft 146 of the electric generator 145. Due to such a structure, when the axis gear 115 is rotated by revolution of the revolution body 110, the first through sixth gears 131 through 136 are sequentially rotated, and accordingly the shaft 146 of the electric generator 145 is also rotated. Meanwhile, the gear assembly 130 illustrated in FIG. 1 is merely exemplary, and it is understood that the gear assembly 130 may be variously changed according to a rotation ratio between the axis gear 115 and the shaft 146 of the electric generator 145. Further, the gear assembly 130 can limit a rotational direction of the shaft 146, and can selectively engage the shaft 146 when charging is not desired or further rotation of the revolution body 110 is to be prevented.

When the shaft 146 of the electric generator 145 is rotated, a current is generated in a coil (not shown) inside the electric generator 145 according to Fleming's right hand rule. The generated current is stored in the secondary cell 150. The electric generator 145 and the secondary cell 150 are supported by the circuit unit 140. The circuit unit 140 is formed in the shape of a circuit board, wherein the isolation member 125 is disposed between the gear assembly 130 and the circuit unit 140. The circuit unit 140 is provided for performing the unique function of an electric device, and includes at least one electric element and a circuit. For example, if the portable electronic device 100 is an MP3 player, the circuit unit 140 may include electric elements and a circuit such that audio data can be reproduced, stored or recorded. However, it is understood the case 101 can be other shapes in other aspects, and that the circuit unit 140 can be disposed outside of the case 101 in other aspects, such as where the case 101 is detachable from a battery-like compartment of a housing of a device including the circuit unit 140.

The isolation member 125 and the circuit unit 140 are fixed to the case 101. Meanwhile, a display panel 106 is mounted on the cover member 104, and can show the state of the portable electronic device 100 or reproduce a moving image to display the moving image. However, it is understood that the display panel 106 need not be used in all aspects and that the display panel 106 can be disposed so as to not be covered by the revolution body 110 during charging.

Hereinafter, an operation of the portable electronic device 100 will be described referring to FIGS. 2 and 3. When both ends of the spindle 120 exposed to the outside in the revolution body 110 are held using ends of the thumb and index finger and slightly shaken, the eccentric revolution body 110 is rotated in one direction as indicated by an arrow of FIG. 3. At this time, since the spindle 120 is pressurized by the ends of the fingers, neither the spindle 120 nor the case 101 are rotated. When the axis gear 115 is rotated due to revolution of the revolution body 110, the gears 131 through 136 of the gear assembly 130 are sequentially rotated, and the shaft 146 of the electric generator 145 is also rotated. The electric generator 145 generates electrical energy due to revolution of the shaft 146, and the generated electrical energy is stored in the secondary cell 150. When a power source switch (not shown) of the portable electronic device 100 is turned on, the electrical energy stored in the secondary cell 150 is supplied to the circuit unit 140 and the display panel 106. Accordingly, users can enjoy the various functions of the portable electronic device 100.

Figure 4:
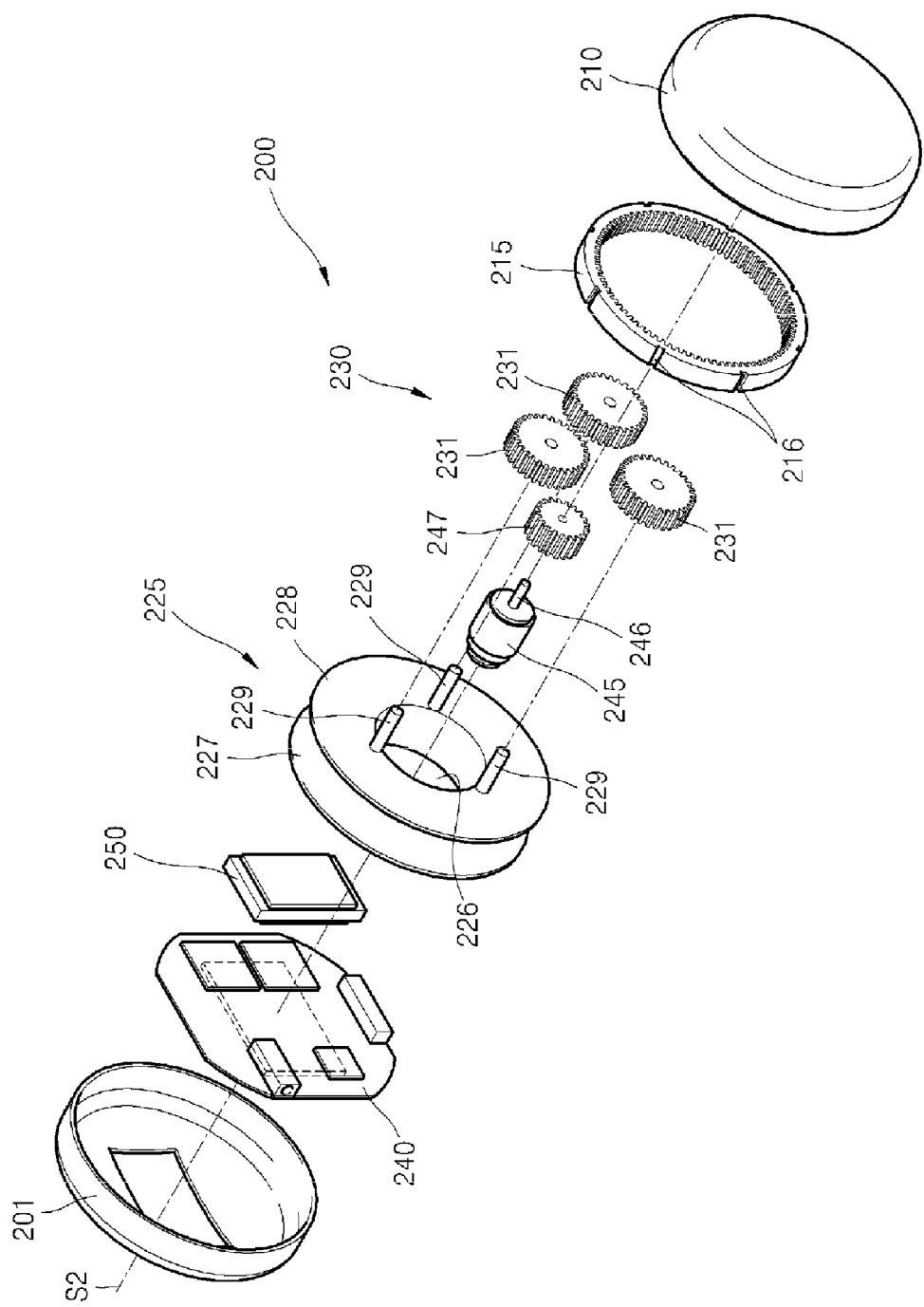
FIG. 4 is an exploded perspective view of a portable electronic device according to another embodiment of the present invention.
Figure 5:
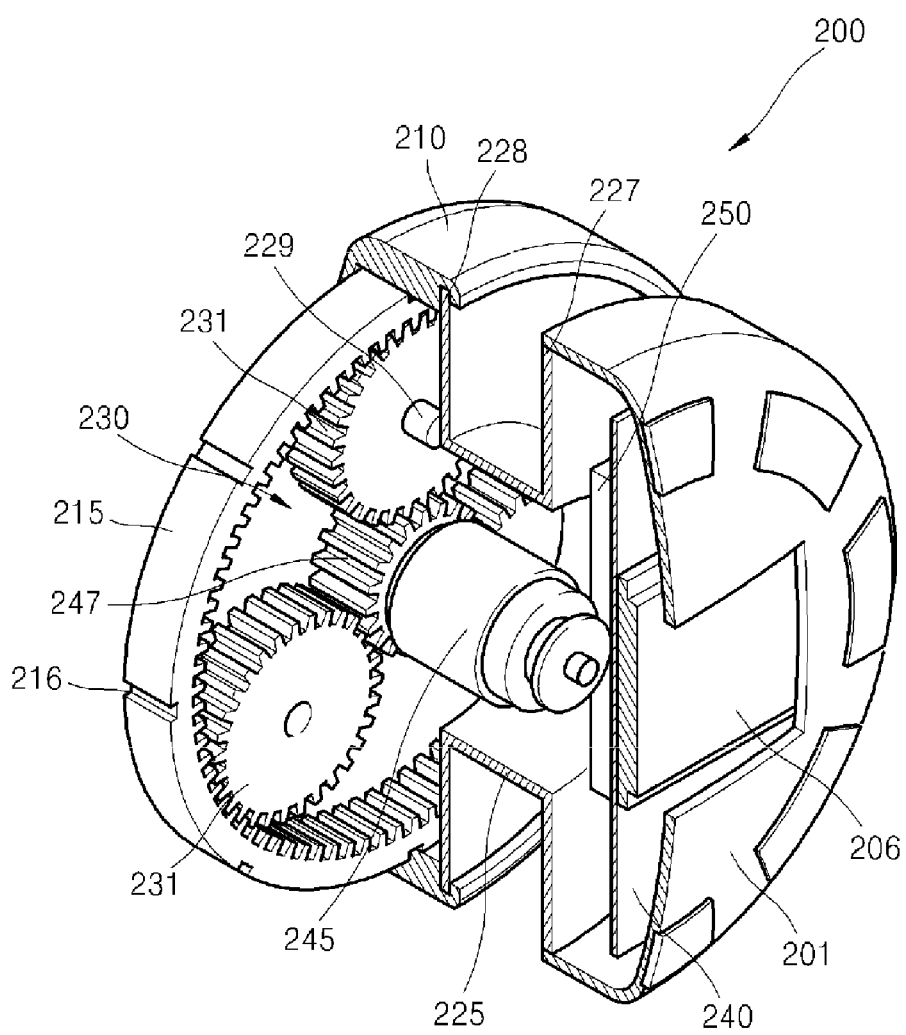
FIG. 5 is a partial perspective view of the portable electronic device of FIG. 4, according to an embodiment of the present invention.
Figure 6:
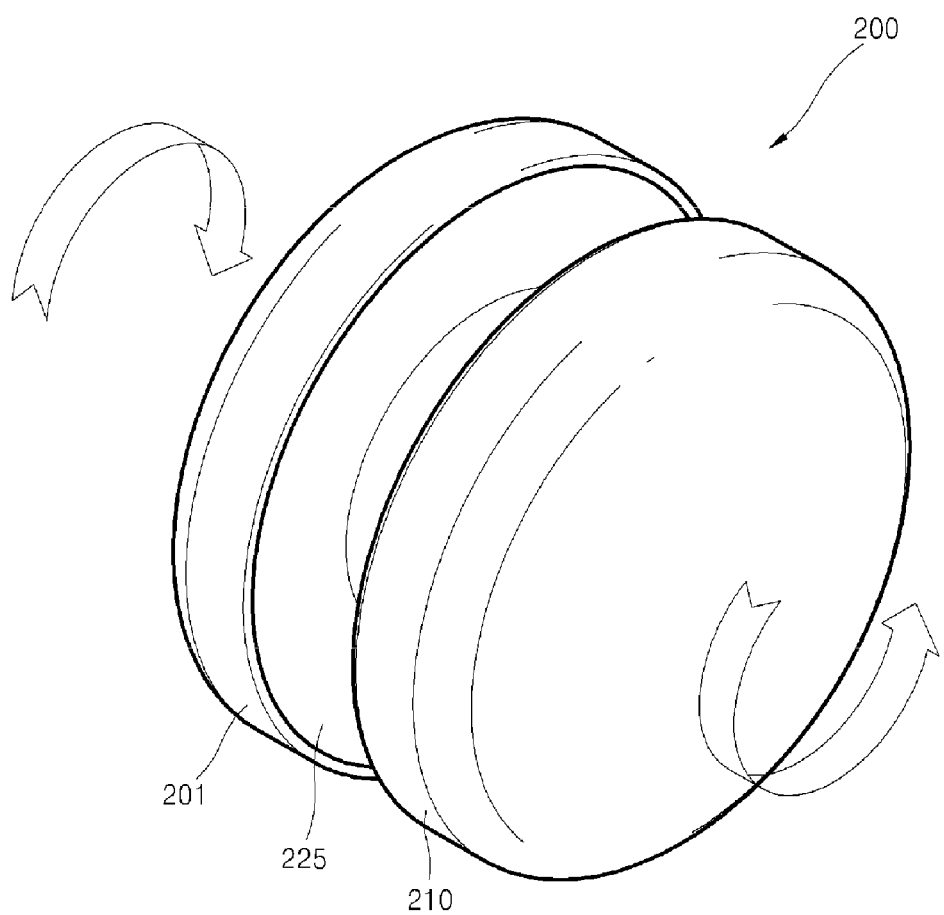
FIG. 6 is a perspective view of an example of an operation of the portable electronic device of FIG. 4, according to an embodiment of the present invention.

FIG. 4 is an exploded perspective view of a portable electronic device 200 according to another embodiment of the present invention. FIG. 5 is a partial perspective view of the portable electronic device 200 of FIG. 4, according to an embodiment of the present invention. FIG. 6 is a perspective view for illustrating an example of an operation of the portable electronic device 200 of FIG. 4, according to an embodiment of the present invention.

Referring to FIGS. 4 and 5, the portable electronic device 200 includes a case 201, a revolution body 210 mounted on the case 201 so as to be rotatable with respect to the case 201, an electric generator 245 converting rotational kinetic energy of the revolution body 210 into electrical energy, a gear assembly 230 transferring rotational force of the revolution body 210 to the electric generator 245, and a secondary cell 250 storing the electrical energy generated by the electric generator 245.

The case 201 and the revolution body 210 define a housing of the portable electronic device 200. An inner space of the housing is divided into two portions by an isolation member 225: a portion of the case 201 and a portion of the revolution body 210. A circuit unit 240 and the secondary cell 250 are disposed in the inner space of the portion of the case 201. An axis gear 215 and a gear assembly 230 are disposed in the inner space of the portion of the revolution body 210 so as to be separated from the secondary cell 250 and the circuit unit 240 by the isolation member 225. A through hole 226 is formed in a central portion of the isolation member 225. The electric generator 245 is disposed to be inserted into the through hole 226. One side 227 of a circumference of the isolation member 225 is coupled to be fixed to an edge of the case 201. An edge of the revolution body 210 is coupled to another side 228 of the circumference of the isolation member 225 to be rotatable relative to the case 201. Accordingly, the revolution body 210 can be rotated with respect to the case 201.

The revolution body 210 includes an axis gear 215 rotating around an axis of rotation S2 of the axis gear 215. The revolution body 210 includes a plurality of protrusions (not shown) protruding into the revolution body 210 from an inner circumference surface of the revolution body 210. The axis gear 215 includes a groove 216 housing the protrusions. However, it is understood that the protrusions can be on the axis gear 215 and the grooves 216 on the revolution body 210 in other aspects Due to such a structure, the axis gear 215 is fixed to the revolution body 210. The axis gear 215 has a ring shape, and includes gear teeth formed on an inner circumference surface of the axis gear 215.

The gear assembly 230 includes three first gears 231 inscribed within the axis gear 215 to be driven. The three first gears 231 are supported by three gear axes 229 included in the isolation member 225. The first gears 231 are engaged with a shaft gear 247 that is coaxially rotated with a shaft 246 of the electric generator 245. The shaft 246 of the electric generator 245 is disposed on the axis of rotation S2 of the revolution body 210. Due to such a structure, when the axis gear 215 is rotated by revolution of the revolution body 210, the first gears 231 of the gear assembly 230 are rotated, and the shaft 246 of the electric generator 245 is also rotated. Meanwhile, the gear assembly 230 illustrated in FIG. 4 is merely exemplary, and it is understood that the gear assembly 230 may be variously changed according to a rotation ratio between the axis gear 215 and the shaft 246 of the electric generator 245.

When the shaft 246 of the electric generator 245 is rotated, a current is generated in a coil (not shown) inside the electric generator 245 according to Fleming's right hand rule. The generated current is stored in the secondary cell 250. The electric generator 245 and the secondary cell 250 are supported by the circuit unit 240. The circuit unit 240 is formed in the shape of a circuit board, and is fixed to an inner surface of the case 201. The circuit unit 240 is provided for performing the unit function of an electric device, and includes at least one electrical element and a circuit. For example, when the portable electronic device 200 is an MP3 player, the circuit unit 240 may include electrical elements and a circuit such that audio data can be reproduced, stored, or recoded. Meanwhile, a display panel 206 is mounted on the case 201, and can show the state of the portable electronic device 200 or reproduce a moving image to display the moving image. As shown, the case 201 and the revolution body 210 are each shaped to fit in the palm of a hand, but can be other shapes in other aspects. While not required in all aspects, an eccentricity of the body 210 can be created so as to create a relative motion between the case 201 and the body 210. Further, the body 210 can have a handle or indentation to allow a user to more easily grip the apparatus 200 to provide the motion in FIG. 6.

Hereinafter, an operation of the portable electronic device 200 will be described referring to FIGS. 5 and 6. The case 201 is held by one hand, and the revolution body 210 is held by the other hand. Then, the case 201 and the revolution body 210 are rotated in directions opposite to each other as indicated by arrows of FIG. 6, and the revolution body 210 is rotated with respect to the case 201. Accordingly, the axis gear 215 is rotated due to revolution of the revolution body 210, the first gears 231 of the gear assembly 230 are rotated, and the shaft 246 of the electric generator 245 is also rotated. The electric generator 245 generates electrical energy due to revolution of the shaft 246, and the generated electrical energy is stored in the secondary cell 250. When a power source switch (not shown) of the portable electronic device 200 is turned on, the electrical energy stored in the secondary cell 250 is supplied to the circuit unit 240 and the display panel 206. Accordingly, users can enjoy the various functions of the portable electronic device 200. However, it is understood that other shapes can allow for other mechanisms of rotation, such as where only the case 201 or the revolution body 210 need to be held to induce the rotation of the revolution body 210 relative to the case 201.

According to aspects of the present invention, a portable electronic device can be used for a prolonged time without as the inconvenience of exchanging primary cells or looking for sockets for charging. Accordingly, costs for exchanging primary cells can be reduced, and environmental pollution due to used primary cells can be reduced.

While a few aspects and example embodiments of the present invention have been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. A portable electronic device comprising:
a case;
a revolution body rotatable with respect to the case, a center of gravity of the revolution body being eccentric from an axis of rotation of the revolution body;
an electric generator to convert rotational kinetic energy of the revolution body due to a rotation of the revolution body relative to the case into electrical energy;
a gear assembly connecting the electric generator and the revolution body to transfer a rotational force due to the rotation of the revolution body to the electric generator, and comprising at least one gear; and
a secondary cell to store the electrical energy generated by the electric generator,
wherein the revolution body includes a first revolution body member and a second revolution body member that are coupled to each other on opposite sides of the case, respectively, and
the gear assembly, the electric generator and the secondary cell are disposed in the case.

2. The portable electronic device of claim 1, further comprising a circuit unit disposed in the case which performs a function of an electric device using the stored electrical energy.

3. The portable electronic device of claim 2, further comprising an isolation member to isolate the gear assembly from the circuit unit, and which supports the at least one gear of the gear assembly.

4. The portable electronic device of claim 1, further comprising a display panel mounted on the case and which is powered by the stored electrical energy.

5. The portable electronic device of claim 1, further comprising a spindle that is disposed on the axis of rotation of the revolution body, wherein the spindle is not interlocked with the revolution body such that the revolution body rotates relative to the spindle about the axis of rotation.

6. The portable electronic device of claim 1, wherein the electric generator is not disposed at a center of rotation.

7. The portable electronic device of claim 1, further comprising an axis gear that is co-centrically rotated together with the first revolution body member, and that is engaged with the at least one gear of the gear assembly to drive the gear assembly.

8. A portable device comprising:
a case;
a revolution body rotatable with respect to the case, a center of gravity of the revolution body being eccentric from an axis of rotation of the revolution body;
an electric generator to convert a rotational motion of the revolution body relative to the housing into electrical energy; and
a secondary cell to store the generated electrical energy generated by the electric generator,
wherein the case and the revolution body define a housing of the portable electronic device and an inner space of the housing is divided into two portions by an isolation member, and
one side of a circumference of the isolation member is coupled to be fixed to an edge of the case and an edge of the revolution body is coupled to another side of the circumference of the isolation member to be rotatable relative to the case.

9. The portable device of claim 8, further comprising an electronic component,
wherein the secondary cell provides the stored electrical energy to the electronic component.

10. The portable device of claim 9, wherein the electronic component, the secondary cell, and the electric generator are disposed in the housing.

11. The portable device of claim 9, further comprising:
a first gear system connected to the electric generator; and
a second gear system connected to the revolution body and which meshes with the first gear system to transmit the rotational motion of the revolution body to the electric generator.

12. The portable device of claim 11,
wherein the second gear system comprises an exterior having a plurality of grooves which is connected to the revolution body and is non-movable relative to the revolution body, and an interior with second gear teeth, and
the first gear system comprises at least one first gear having first gear teeth in contact with the second gear teeth so as to mesh with the second gear teeth to transmit the rotational motion of the revolution body to the electric generator.

13. The portable device of claim 12, wherein the electric generator is disposed at the center of rotation.

14. The portable device of claim 11, wherein the isolation member isolates the first gear system from the electric component, and supports the at least one gear of the first gear system.

* * * * *